(12) United States Patent
Lin et al.

(10) Patent No.: US 8,351,335 B2
(45) Date of Patent: Jan. 8, 2013

(54) INTELLIGENT HOTSPOT CONNECTION SYSTEMS AND METHODS

(75) Inventors: Yu-Fan Lin, Taipei (TW); Fu-Shan Fang, Shueishang Township, Chiayi County (TW); Cheng-Chun Lin, Banciao (TW); Yi-Yao Tseng, Taipei (TW); Hung-Jui Wang, Taipei (TW)

(73) Assignee: Institute for Information Industry, Taipei (TW)

( * ) Notice: Subject to any disclaimer, the term of this patent is extended or adjusted under 35 U.S.C. 154(b) by 805 days.

(21) Appl. No.: 12/488,038

(22) Filed: Jun. 19, 2009

(65) Prior Publication Data

US 2010/0246486 A1  Sep. 30, 2010

(30) Foreign Application Priority Data

Mar. 24, 2009 (TW) .............................. 98109472 A

(51) Int. Cl.
*G01R 31/08* (2006.01)
*G04W 4/00* (2006.01)
(52) U.S. Cl. ....................................... 370/238; 370/332
(58) Field of Classification Search .................. 250/306, 250/307, 310, 311
See application file for complete search history.

(56) References Cited

U.S. PATENT DOCUMENTS

| | | | |
|---|---|---|---|
| 7,191,239 B2 | 3/2007 | Rozenfeld et al. | |
| 2007/0047008 A1* | 3/2007 | Graham et al. | 358/401 |
| 2007/0121561 A1* | 5/2007 | Yashar et al. | 370/338 |
| 2008/0200168 A1* | 8/2008 | Jiang | 455/432.1 |
| 2009/0080381 A1* | 3/2009 | Yashar et al. | 370/331 |
| 2009/0109941 A1* | 4/2009 | Carter | 370/338 |
| 2009/0219833 A1* | 9/2009 | Yaqub et al. | 370/254 |
| 2010/0054179 A1* | 3/2010 | Meyer | 370/328 |
| 2010/0068997 A1* | 3/2010 | Dunko | 455/41.1 |

FOREIGN PATENT DOCUMENTS

| | | |
|---|---|---|
| CN | 1618208 A | 5/2005 |
| CN | 1714594 A | 12/2005 |

* cited by examiner

*Primary Examiner* — Eunsook Choi
(74) *Attorney, Agent, or Firm* — Birch, Stewart, Kolasch & Birch, LLP

(57) ABSTRACT

Intelligent hotspot connection systems and methods are provided. The intelligent hotspot connection system includes a storage unit, a wireless connection unit, and a processing unit. The storage unit includes a hotspot information database recording at least one property for each of a plurality of hotspots, and a hotspot preference database recording at least one preference inclination, respectively defining a reference weight for the property and signal strength. The processing unit detects the signal strength of the respective hotspots via the wireless connection unit. The processing unit obtains the preference inclination, and calculates a score for the respective hotspots according to the preference inclination, the property and signal strength of the respective hotspots. The processing unit selects and automatically connects to the hotspot with the highest score via the wireless connection unit.

15 Claims, 5 Drawing Sheets

INTELLIGENT HOTSPOT CONNECTION SYSTEMS AND METHODS

CROSS REFERENCE TO RELATED APPLICATIONS

This Application claims priority of Taiwan Patent Application No. 098109472, filed on Mar. 24, 2009, the entirety of which is incorporated by reference herein.

BACKGROUND OF THE INVENTION

1. Field of the Invention

The disclosure relates generally to intelligent hotspot connection systems and methods, and more particularly, to systems and methods that automatically determine a hotspot and/or the process for logining to the hotspot according to user preference and hotspot properties.

2. Description of the Related Art

Recently, applications for wireless networks have become more important and valuable due to increased convenience and functions of portable electronic devices. Related infrastructures, such as hotspots/access points, must be set up by the wireless network service provider, such that users can link and login to the wireless network service via their portable electronic devices.

Generally, when users want to link to a wireless network, a wireless network scanning module in their electronic devices must be activated to detect available wireless network providers in a surrounding environment. Users must determine and select a specific provider by themselves, and manually operate their electronic devices to link to the hotspot supplied by the specific provider. In some situations, a user may respectively have several accounts for wireless network providers, and the signal strength, charge conditions and connection mechanisms for each wireless network provider may be different. Therefore, users usually determine a wireless network provider according to several characteristics such as signal strength, cost, charging rate or security enhancement. It is troublesome for users to determine which wireless network provider or hotspot should be connected. Additionally, since there are different login procedures for each wireless network provider, users must intimately know login procedures and corresponding account names and passwords for different wireless network providers. Memorization and operation of several account names/passwords and login procedures are indeed troublesome for users.

U.S. Pat. No. 7,191,239 discloses a method and system to customize and update a network connection application for distribution to multiple end-users. In this patent, the system can automatically recognize and mark the hotspots which belonging to one alliance for helping the users to select. However, no automatic determination mechanism for hotspots based on user preferences is provided.

BRIEF SUMMARY OF THE INVENTION

Intelligent hotspot connection systems and methods are provided.

An embodiment of an intelligent hotspot connection system includes a storage unit, a wireless connection unit, and a processing unit. The storage unit includes a hotspot information database recording at least one property for each of a plurality of hotspots, and a hotspot preference database recording at least one preference inclination, respectively defining a plurality of reference weights that each weight is respectively corresponding to at least one property and the signal strength. The processing unit detects the signal strength of available hotspots, obtains the preference inclination, and calculates a score for each hotspot according to the preference inclination, the property and signal strength of each hotspot. Furthermore, the processing unit selects and automatically connects to the hotspot with the highest score via the wireless connection unit.

In an embodiment of an intelligent hotspot connection method, at least one preference inclination is obtained, wherein the preference inclination respectively defines a plurality of reference weights that each weight is respectively corresponding to at least one property and the signal strength. Then, the signal strength of hotspots is detected. A score for those hotspots is calculated according to the preference inclination, the property and signal strength of them. The hotspot with the highest score is selected and automatically connected.

In some embodiments, the processing unit further retrieves a login procedure which is specific to certain hotspot with authorized user's account and password applied to retrieve login procedure and thus makes automatic procedure possible.

In some embodiments, the processing unit further determines whether the connection corresponding to the selected hotspot is disconnected or not. When the connection is disconnected, the processing unit once again detects the signal strength of the respective hotspots via the wireless connection unit, and recalculates a score for the respective hotspots according to the preference inclination, the property and signal strength of the respective hotspots. The processing unit re-selects another hotspot with the highest score according to the scores of the respective hotspots, and automatically connects to the re-selected hotspot via the wireless connection unit.

Intelligent hotspot connection systems and methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Intelligent hotspot connection systems and methods are provided.

Figure 1:
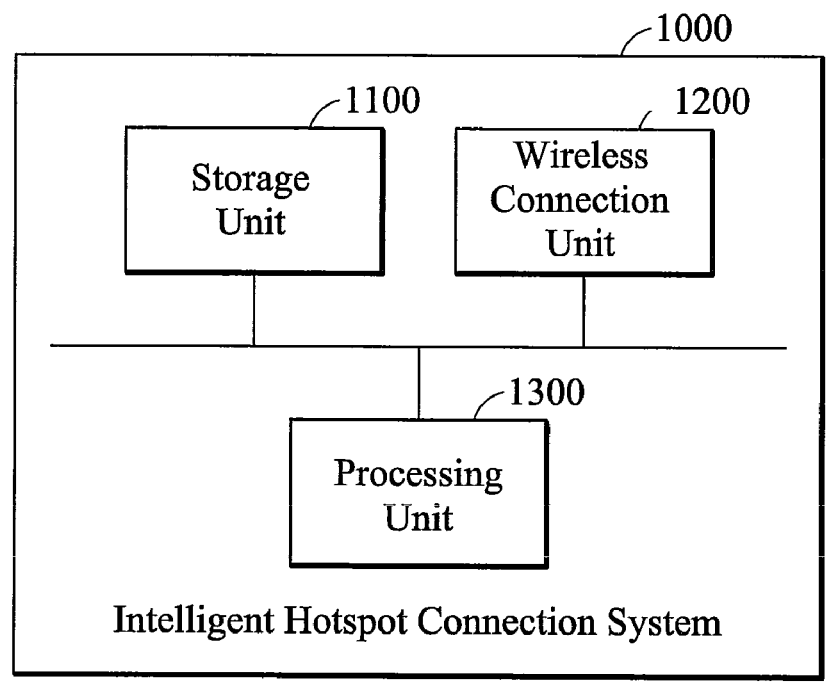
FIG. 1 is a schematic diagram illustrating an embodiment of an intelligent hotspot connection system of the invention.

FIG. 1 is a schematic diagram illustrating an embodiment of an intelligent hotspot connection system of the invention. The intelligent hotspot connection system 1000 can be used in an electronic device, such as a portable electronic device.

The intelligent hotspot connection system 1000 comprises a storage unit 1100, a wireless connection unit 1200, and a processing unit 1300.

Figure 2:
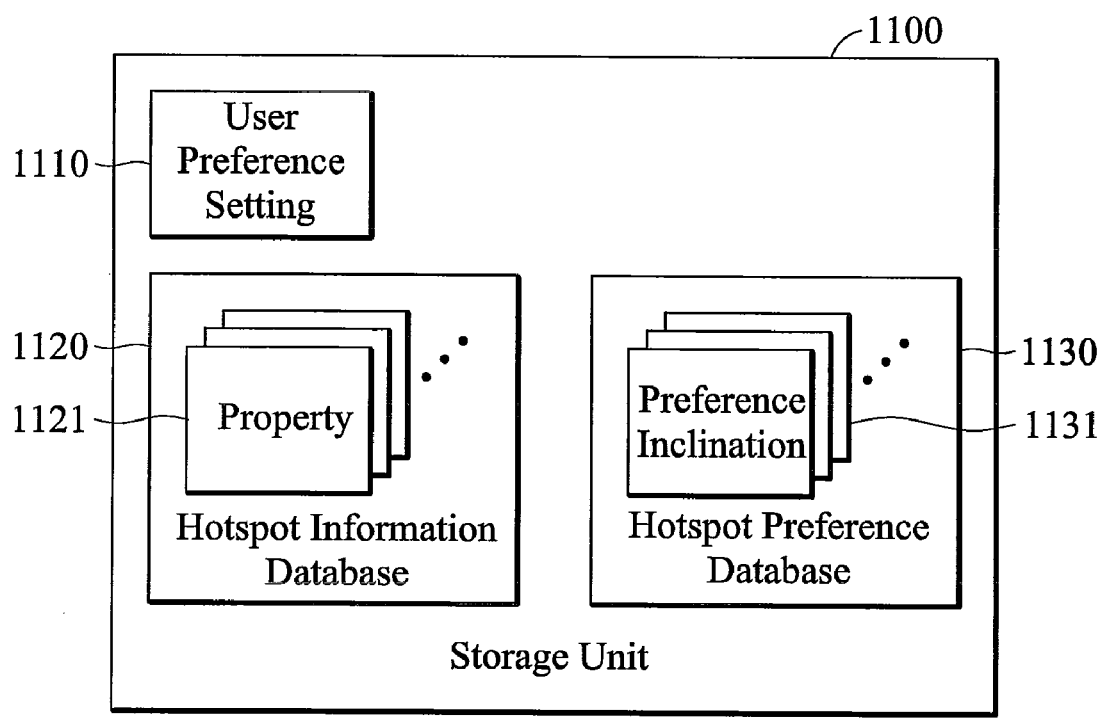
FIG. 2 is a schematic diagram illustrating an embodiment of a storage unit of the invention.

FIG. 2 is a schematic diagram illustrating an embodiment of a storage unit of the invention. The storage unit 1100 comprises a user preference setting 1110, a hotspot information database 1120, and a hotspot preference database 1130. The hotspot information database 1120 records at least one property 1121, such as charge condition, charge rate, and/or connection security for respective hotspots. The charge condition may be charge or free, which can be represented by 0 and 1. The connection security may be the encryption degree, such as no encryption, WEP (Wired Equivalent Privacy), WRA (Wi-Fi Protected Access) and/or WPA2. It is noted that, various charge rates and connection security types can be respectively corresponded to a specific value. In some embodiments, a cheaper rate may be corresponded to a higher value, and an encryption degree with a better security may be corresponded to a higher value. It is understood that, the properties are examples of the invention, and are not limited thereto.

The hotspot preference database 1130 records a plurality of preference inclinations 1131. Each of the preference inclinations 1131 respectively defines a plurality of reference weights that each weight respectively corresponds to at least one property 1121 and the signal strength. In some embodiments, the preference inclination 1131 may comprise a free hotspot inclination, a signal strength inclination, a rate inclination, and/or a security degree inclination, and the reference weights may comprise $C_1$, $C_2$, $C_3$, and $C_s$. When the preference inclination 1131 is the free hotspot inclination, the reference weight corresponding to the charge condition may be greater than the reference weights respectively corresponding to the rate, the security, and the signal strength. In some embodiments, $C_1 > C_2 = C_3 = C_s$, wherein $C_1$ is the reference weight corresponding to the charge condition, $C_2$ is the reference weight corresponding to the rate, $C_3$ is the reference weight corresponding to the security, and $C_s$ is the reference weight corresponding to the signal strength. When the preference inclination 1131 is the signal strength inclination, the reference weight corresponding to the signal strength may be greater than the reference weights respectively corresponding to the charge condition, the rate, and the security. In some embodiments, $C_s > C_1 = C_2 = C_3$. When the preference inclination 1131 is the rate inclination, the reference weights respectively corresponding to the rate and the signal strength may be greater than the reference weights respectively corresponding to the charge condition and the security. In some embodiments, $C_s = C_2 > C_1 = C_3$. When the preference inclination 1131 is the security degree inclination, the reference weight corresponding to the security may be greater than the reference weights respectively corresponding to the charge condition, the rate, and the signal strength. In some embodiments, $C_3 > C_1 = C_2 = C_s$. It is understood that, the above preference inclinations and corresponding reference weights are examples of the embodiment, and the invention is not limited thereto. The operation of the user preference setting 1110, the property 1121 and the preference inclination 1131 are discussed later.

The wireless connection unit 1200 can wirelessly detect hotspots in a surrounding environment, and connect to the detected hotspots. The processing unit 1300 performs the intelligent hotspot connection methods of the invention, which will be discussed further in the following paragraphs.

Figure 3:
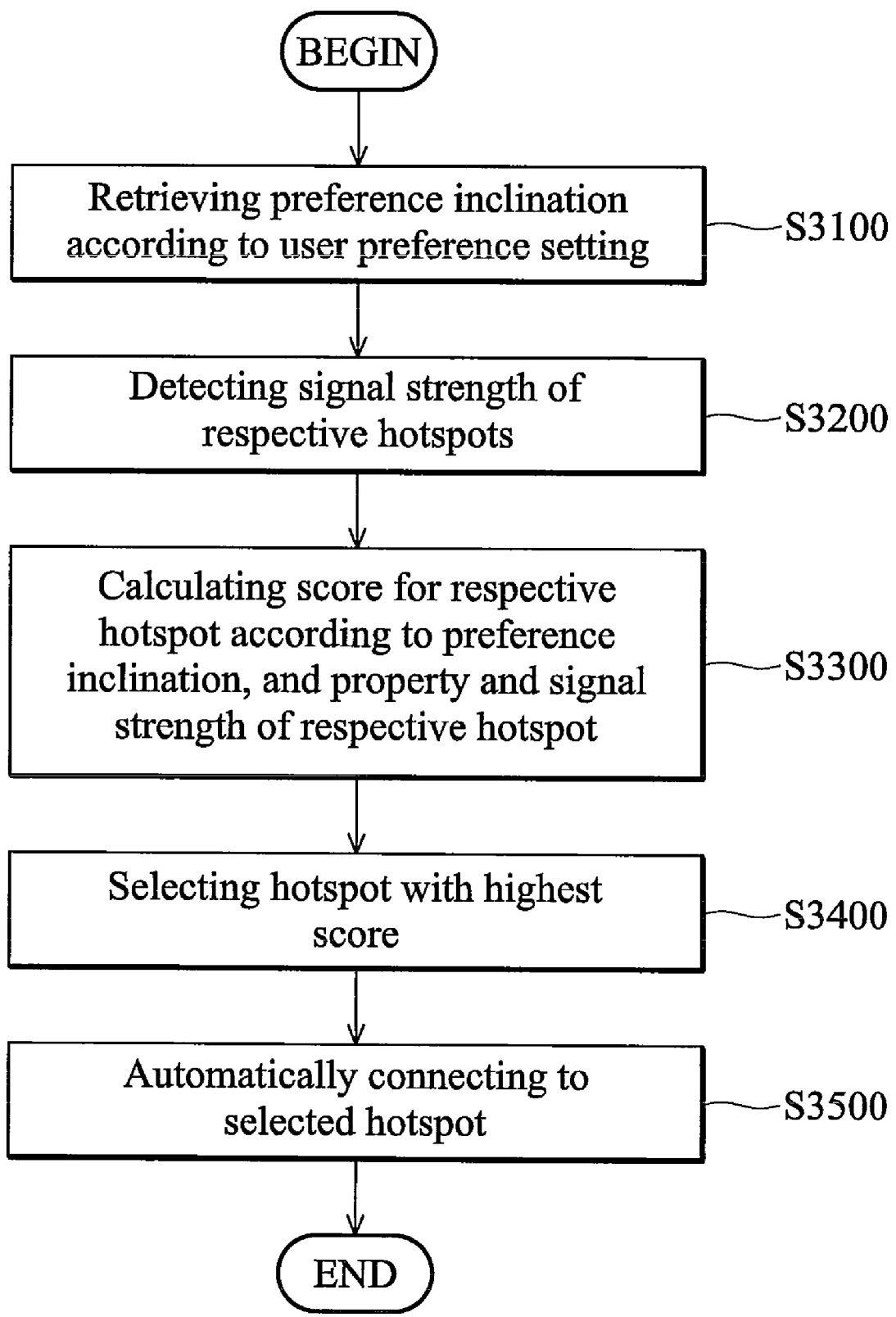
FIG. 3 is a flowchart of an embodiment of an intelligent hotspot connection method of the invention.

FIG. 3 is a flowchart of an embodiment of an intelligent hotspot connection method of the invention. The intelligent hotspot connection method can be used in an electronic device, such as a portable electronic device.

In step S3100, the user preference setting 1110 is read, and a corresponding preference inclination 1131 is retrieved from the hotspot preference database 1130 according to the user preference setting 1110. It is noted that, the user preference setting 1110 may be one of the corresponding preference inclinations 1131. Similarly, the preference inclination 1131 may respectively define a plurality of reference weights that each weight is respectively corresponding to at least one property 1121 of hotspots and the signal strength. Then, in step S3200, the signal strength of the respective hotspots is detected via the wireless connection unit 1200. In step S3300, a score for the respective hotspot is calculated according to the preference inclination 1131, and the property and signal strength of the respective hotspot, using the following formula:

$$Z = \sum_{i=1}^{n} P_i \times C_i + S \times C_s,$$

wherein Z is the score for the hotspot, $P_i$ is the properties of the hotspot, $C_i$ is the reference weights corresponding to the respective properties, n is the number of the properties, S is the signal strength of the hotspot, and $C_s$ is the reference weight corresponding to the signal strength.

After the scores for the respective hotspots are calculated, in step S3400, the hotspot with the highest score is selected, and in step S3500, the selected hotspot is automatically connected to via the wireless network unit 1200.

Figure 4:
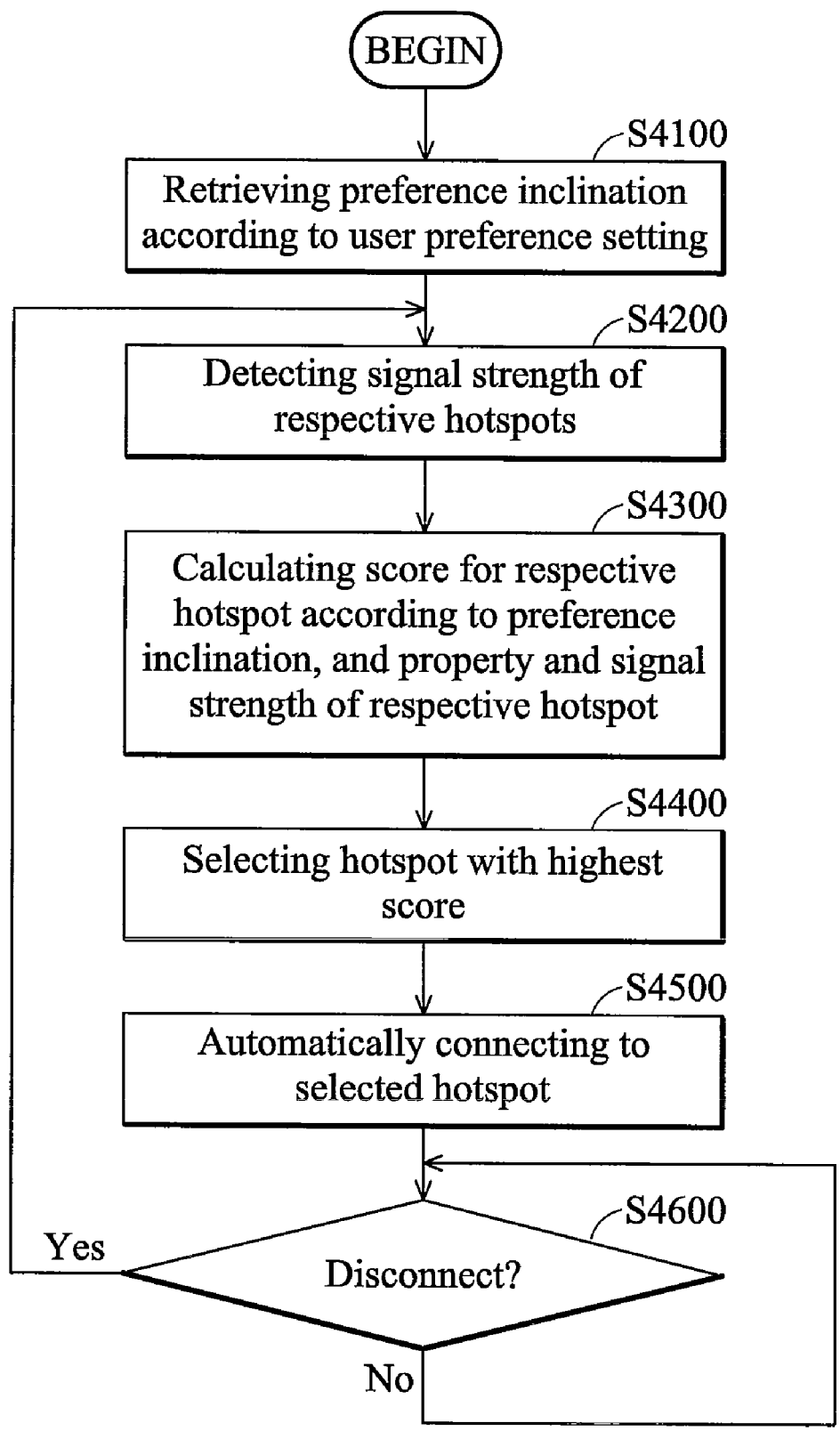
FIG. 4 is a flowchart of another embodiment of an intelligent hotspot connection method of the invention.

FIG. 4 is a flowchart of another embodiment of an intelligent hotspot connection method of the invention. The intelligent hotspot connection method can be used in an electronic device, such as a portable electronic device. In this embodiment, the connection status can be continuously determined, and the hotspot selection and connection are automatically performed when the connection status is disconnected.

In step S4100, the user preference setting 1110 is read, and a corresponding preference inclination 1131 is retrieved from the hotspot preference database 1130 according to the user preference setting 1110. Similarly, the user preference setting 1110 may be one of the corresponding preference inclinations 1131, and the preference inclination 1131 may respectively define a reference weight for the properties 1121 of hotspot and the signal strength. Then, in step S4200, the signal strength of respective hotspots is detected via the wireless connection unit 1200. In step S4300, a score for the respective hotspot is calculated according to the preference inclination 1131, and the property and signal strength of the respective hotspot, using the following formula:

$$Z = \sum_{i=1}^{n} P_i \times C_i + S \times C_s,$$

wherein Z is the score for the hotspot, $P_i$ is the properties of the hotspot, $C_i$ is the reference weights corresponding to the respective properties, n is the number of the properties, S is the signal strength of the hotspot, and $C_s$ is the reference weight corresponding to the signal strength.

Then, in step S4400, the hotspot with the highest score is selected, and in step S4500, the selected hotspot is automatically connected via the wireless network unit 1200. After the connection is established, in step S4600, it is determined whether the connection corresponding to the selected hotspot is disconnected or not. When the connection corresponding to the selected hotspot still keeps alive (No in step S4600), the procedure remains at step S4600. When the connection corresponding to the selected hotspot is disconnected (Yes in step S4600), the procedure returns to step S4200 to re-detect the signal strength of the respective hotspots, and the steps S4300 to S4600 are repeated.

Figure 5:
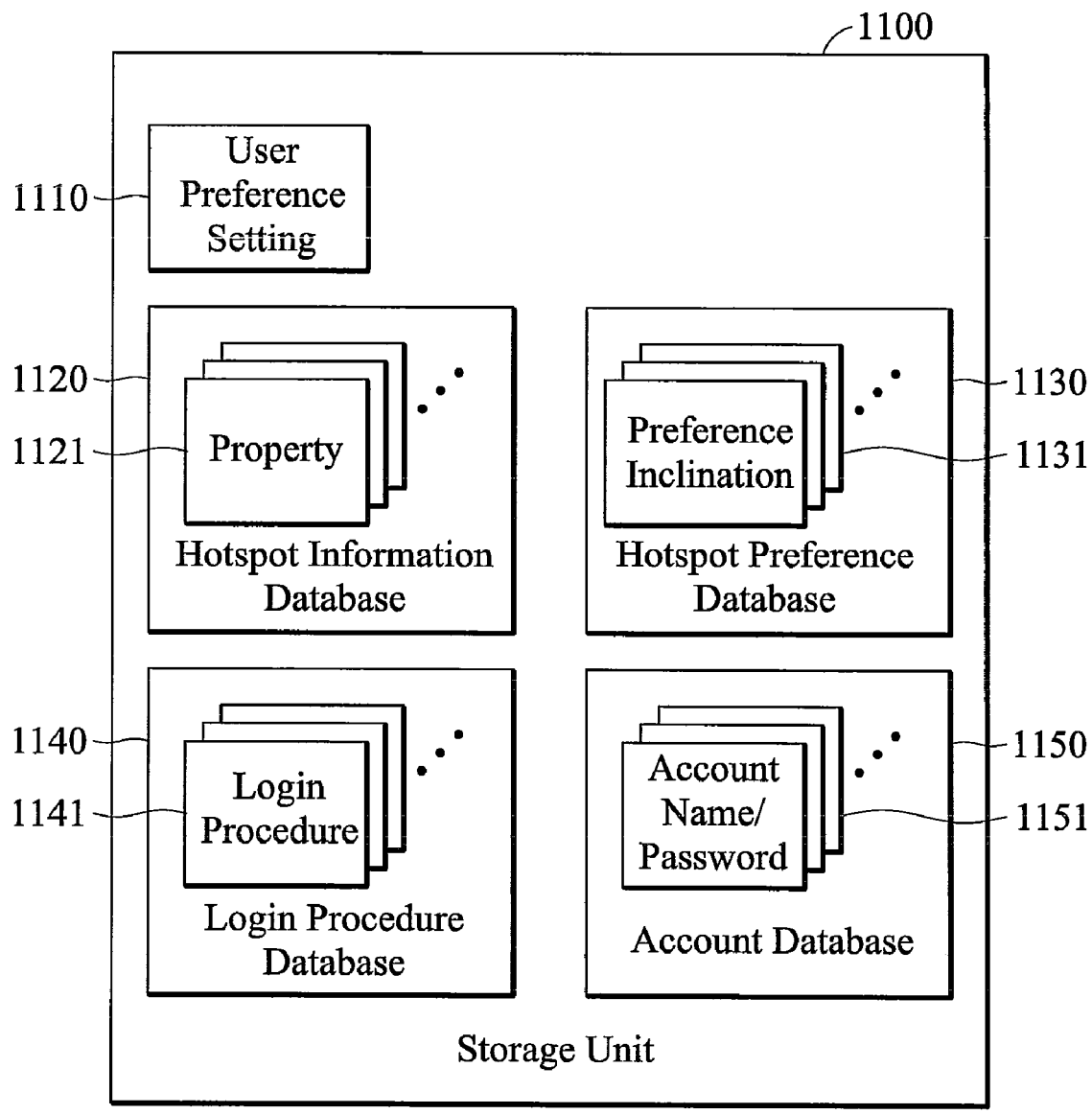
FIG. 5 is a schematic diagram illustrating another embodiment of a storage unit of the invention.

FIG. 5 is a schematic diagram illustrating another embodiment of a storage unit of the invention. It is noted that, the same components in FIG. 2 and FIG. 5 are with the same labels.

The storage unit 1100 comprises a user preference setting 1110, a hotspot information database 1120, a hotspot preference database 1130, a login procedure database 1140, and an account database 1150. The hotspot information database 1120 records at least one property 1121, such as charged condition, charged rate, and/or connection security for respective hotspots. Various charged conditions, charged rates, and connection security types can be respectively corresponded to a specific value. The hotspot preference database 1130 records a plurality of preference inclinations 1131. Each of the preference inclinations 1131 respectively defines a reference weight for the property 1121 and the signal strength. The login procedure database 1140 records login procedures 1141 for different hotspots. The login procedure may comprise the procedure, interfaces, timing, and/or required data for login to the hotspot. The account database 1150 records account names/passwords 1151 for hotspots. The use of the login procedure 1141 and the account name/password 1151 is discussed later.

Figure 6:
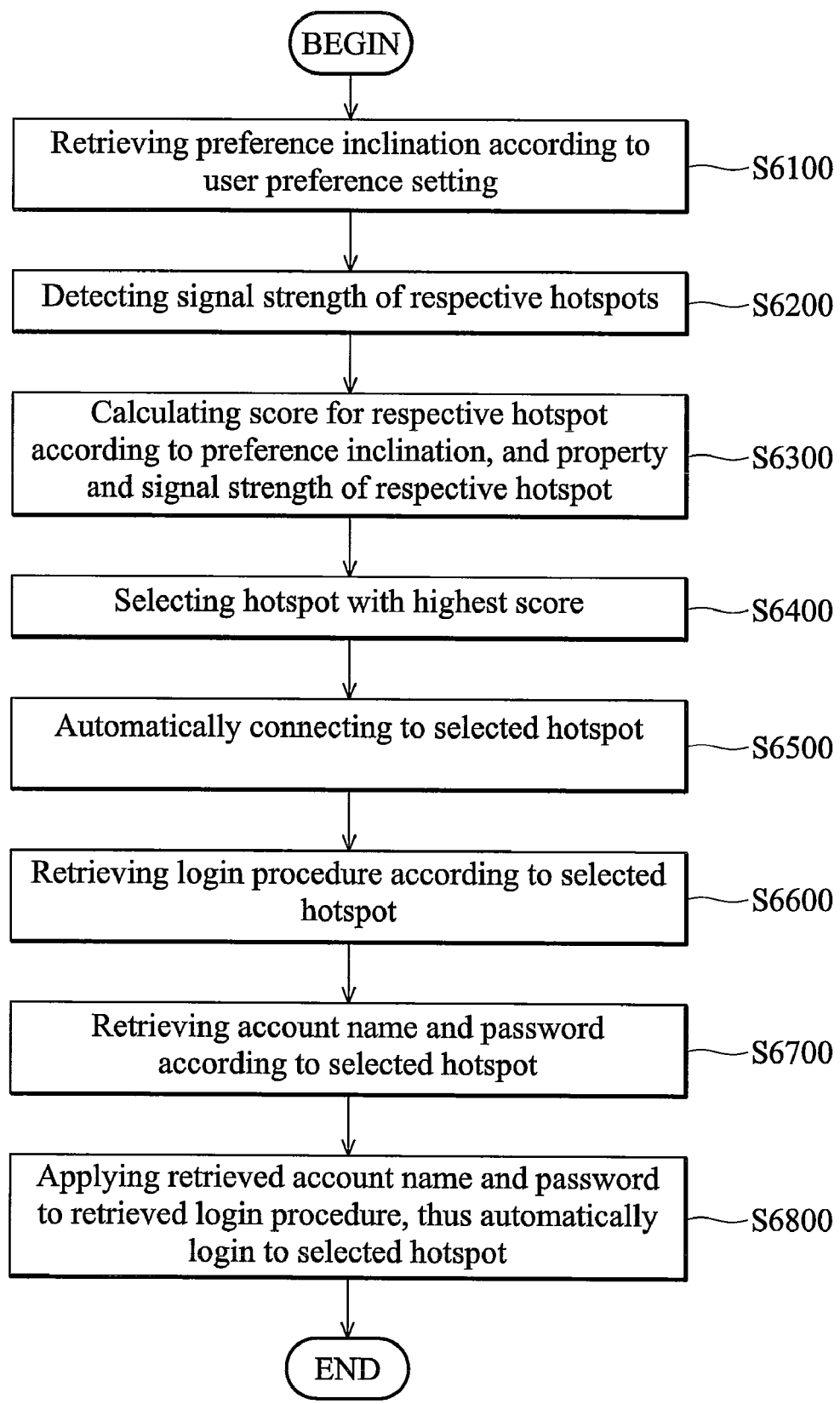
FIG. 6 is a flowchart of another embodiment of an intelligent hotspot connection method of the invention.

FIG. 6 is a flowchart of an embodiment of an intelligent hotspot connection method of the invention. The intelligent hotspot connection method can be used in an electronic device, such as a portable electronic device. In this embodiment, the login procedures for different hotspots can be integrated, and the login process can be automatically completed.

In step S6100, the user preference setting 1110 is read, and a corresponding preference inclination 1131 is retrieved from the hotspot preference database 1130 according to the user preference setting 1110. Similarly, the user preference setting 1110 may be one of the corresponding preference inclinations 1131, and the preference inclination 1131 may respectively define a reference weight for the properties 1121 of hotspot and the signal strength. Then, in step S6200, the signal strength of respective hotspots is detected via the wireless connection unit 1200. In step S6300, a score for the respective hotspot is calculated according to the preference inclination 1131, and the property and signal strength of the respective hotspot, using the following formula:

$$Z = \sum_{i=1}^{n} P_i \times C_i + S \times C_s,$$

wherein Z is the score for the hotspot, $P_i$ is the properties of the hotspot, $C_i$ is the reference weights corresponding to the respective properties, n is the number of the properties, S is the signal strength of the hotspot, and $C_s$ is the reference weight corresponding to the signal strength.

Then, in step S6400, the hotspot with the highest score is selected, and in step S6500, the selected hotspot is automatically connected to via the wireless network unit 1200. Then, in step S6600, a corresponding login procedure 1141 is retrieved from the login procedure database 1140 according to the selected hotspot, and in step S6700, corresponding account name and password 1151 are retrieved from the account database 1150 according to the selected hotspot. Then, in step S6800, the retrieved account name and password 1151 are applied to the retrieved login procedure 1141, thus to automatically login to the selected hotspot.

It is understood that, in some embodiments, the intelligent hotspot connection system can record variation of the user preference settings, and dynamically adjust the reference weights corresponding to the properties and/or signal strength in the preference inclination according to the variation of user preference settings.

Therefore, the intelligent hotspot connection systems and methods can automatically determine a hotspot according to user preference and hotspot properties, and/or perform the login process for the hotspot.

Intelligent hotspot connection systems and methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An intelligent hotspot connection system for use in an electronic device, comprising:
   a storage unit comprising:
      a hotspot information database recording at least one property for each of a plurality of hotspots; and
      a hotspot preference database recording at least one preference inclination, respectively defining a plurality of reference weights that each weight is respectively corresponding to the at least one property and a signal strength;
   a wireless connection unit; and
   a processing unit obtaining the preference inclination from the hotspot preference database, detecting the signal strength of the respective hotspots via the wireless connection unit, calculating a score for the respective hotspots according to the preference inclination, the property and the signal strength of the respective hotspots, selecting the hotspot with the highest score according to the scores of the respective hotspots, and automatically connecting to the selected hotspot via the wireless connection unit.

2. The system of claim 1, wherein the property comprises a charge condition, a charge rate, or a connection security.

3. The system of claim 1, wherein the processing unit calculates the score for the respective hotspot according to the following formula:

$$Z = \sum_{i=1}^{n} P_i \times C_i + S \times C_s,$$

wherein Z is the score, $P_i$ is the property, $C_i$ is the reference weight corresponding to the property, n is the number of the property, S is the signal strength, and $C_s$ is the reference weight corresponding to the signal strength.

4. The system of claim 1, wherein the at least one property comprises a charge condition, a rate and a security, and wherein when the preference inclination is a free hotspot inclination, the reference weight corresponding to the charge condition is greater than the reference weights respectively corresponding to the rate, the security, and the signal strength; when the preference inclination is a signal strength inclination, the reference weight corresponding to the signal strength is greater than the reference weights respectively corresponding to the charge condition, the rate, and the security; when the preference inclination is a rate inclination, the reference weights respectively corresponding to the rate and the signal strength are greater than the reference weights respectively corresponding to the charge condition, and the security; or when the preference inclination is a security degree inclination, the reference weight corresponding to the security is greater than the reference weights respectively corresponding to the charge condition, the rate, and the signal strength.

5. The system of claim 1, wherein the storage unit further comprises:
   a login procedure database recording login procedures corresponding to the respective hotspots; and
   an account database recording account names and passwords for the respective hotspots, wherein the processing unit further retrieves one of the login procedure corresponding to the selected hotspot from the login procedure database according to the selected hotspot, retrieves one of the account name and password corresponding to the selected hotspot from the account database according to the selected hotspot, and applies the retrieved account name and password to the retrieved login procedure, thus to automatically login to the selected hotspot.

6. The system of claim 1, wherein the processing unit further determines whether a connection corresponding to the selected hotspot is disconnected or not, and when the connection corresponding to the selected hotspot is disconnected, once again detects the signal strength of the respective hotspots via the wireless connection unit and calculates a score for the respective hotspots according to the preference inclination, the property and signal strength of the respective hotspots, re-selects another hotspot with the highest score according to the scores of the respective hotspots, and automatically connects to the re-selected hotspot via the wireless connection unit.

7. The system of claim 1, wherein the storage unit further comprises a user preference setting, and the processing unit retrieves the preference inclination from the hotspot preference database according to the user preference settings.

8. An intelligent hotspot connection method for use in an electronic device, the electronic device comprising:
   a storage unit, a wireless connection unit and a processing unit, wherein the storage unit comprises a hotspot information database and a hotspot preference database, and the hotspot information database records at least one property for each of a plurality of hotspots, the method comprising using the processing unit to perform the following steps of:
   obtaining a preference inclination from the hotspot preference database, wherein the preference inclination respectively defines a plurality of reference weights that each weight is respectively corresponding to the at least one property and a signal strength;
   detecting the signal strength of respective hotspots via the wireless connection unit;
   calculating a score for the respective hotspots according to the preference inclination, the property and the signal strength of the respective hotspots;
   selecting the hotspot with the highest score according to the scores of the respective hotspots; and
   automatically connecting to the selected hotspot via the wireless connection unit.

9. The method of claim 8, wherein the property comprises a charge condition, a charge rate, or a connection security.

10. The method of claim 8, wherein the score for the respective hotspot is calculated according to the following formula:

$$Z = \sum_{i=1}^{n} P_i \times C_i + S \times C_s,$$

wherein Z is the score, $P_i$ is the property, $C_i$ is the reference weight corresponding to the property, n is the number of the property, S is the signal strength, and $C_s$ is the reference weight corresponding to the signal strength.

11. The method of claim 8, wherein the at least one property comprises a charge condition, a rate and a security, and wherein when the preference inclination is a free hotspot inclination, the reference weight corresponding to the charge condition is greater than the reference weights respectively corresponding to the rate, the security, and the signal strength; when the preference inclination is a signal strength inclination, the reference weight corresponding to the signal strength is greater than the reference weights respectively corresponding to the charge condition, the rate, and the security; when the preference inclination is a rate inclination, the reference weights respectively corresponding to the rate and the signal strength are greater than the reference weights respectively corresponding to the charge condition, and the security; or when the preference inclination is a security degree inclination, the reference weight corresponding to the security is greater than the reference weights respectively corresponding to the charge condition, the rate, and the signal strength.

12. The method of claim 8, further comprising:
   retrieving one of login procedures corresponding to the respective hotspots according to the selected hotspot;
   retrieving one of account names and passwords corresponding to the respective hotspots according to the selected hotspot; and
   applying the retrieved account name and password to the retrieved login procedure, thus to automatically login to the selected hotspot.

13. The method of claim 8, further comprising:
   determining whether a connection corresponding to the selected hotspot is disconnected or not; and
   when the connection corresponding to the selected hotspot is disconnected, re-detecting the signal strength of the respective hotspots via the wireless connection unit, calculating a score for the respective hotspots according to the preference inclination, the property and signal strength of the respective hotspots, and re-selecting another hotspot with the highest score according to the scores of the respective hotspots, and automatically connecting to the re-selected hotspot via the wireless connection unit.

14. The method of claim 8, further comprising:
obtaining a user preference setting; and
retrieving the preference inclination from a plurality of preference inclinations according to the user preference setting.

15. A non-transitory machine-readable storage medium comprising a computer program, which, when executed, causes a device to perform an intelligent hotspot connection method, the device comprising:
    a storage unit, a wireless connection unit and a processing unit, wherein the storage unit comprises a hotspot information database and a hotspot preference database, and the hotspot information database records at least one property for each of a plurality of hotspots, the method comprising using the processing unit to perform the following steps of:
obtaining a preference inclination from the hotspot preference database, wherein the preference inclination respectively defines a plurality of reference weights that each weight is respectively corresponding to the at least one property for hotspot and a signal strength;
detecting the signal strength of respective hotspots via the wireless connection unit;
calculating a score for the respective hotspots according to the preference inclination, the property and the signal strength of the respective hotspots;
selecting the hotspot with the highest score according to the scores of the respective hotspots; and
automatically connecting to the selected hotspot via the wireless connection unit.

\* \* \* \* \*